Patented Aug. 17, 1943

2,327,189

UNITED STATES PATENT OFFICE 2,327,189

TREATMENT OF HYDROCARBONS

Vladimir N. Ipatieff and Vladimir Haensel, Chicago, Ill., assignors to Universal Oil Products Company, Chicago, Ill., a corporation of Delaware No Drawing. Application August 21, 1940, Serial No. 353,509

1 Claim. (Cl. 260—683)

This invention relates to the use of particular catalytic materials and particular conditions of operation in reactions involving dehydrogenation of hydrocarbons, and is a continuation-in-part of our co-pending application Serial No. 274,970, filed May 22, 1939.

In one specific embodiment the present invention comprises a process for dehydrogenating hydrocarbons which comprises contacting the vapors of said hydrocarbons mixed with hydrogen in an amount of approximately 20–60% of the total mixture at temperatures within the approximate range of 450–700° C. and vapor space velocities from 200 to 10,000 with composite catalysts comprising essentially copper, zinc, and alumina, the vapor space velocities indicated being exclusive of the hydrogen in admixture with the vapors.

In producing the preferred catalyst composite for the process of this invention, zinc of approximately 30–200 mesh, copper of approximately 100–120 mesh, and alumina of approximately 30–80 mesh are mixed in the desired proportions, formed into particles by pelleting, extrusion or any other suitable method, then treated with an inert gas or air with a controlled oxygen concentration at a temperature in the approximate range of 500–600° C. In a number of runs the use of alumina of 40–50 mesh has resulted in the formation of catalyst particles of good physical structure and of relatively high catalytic activity. The proportion of the three materials indicated may be varied to produce catalysts of different activities but it has been found that the use of approximately equal parts by weight of these ingredients results in a catalyst of high activity, as measured by the dehydrogenation of butane at 600° C. using a vapor space velocity of approximately 1200. Further, we have found that catalysts with desirable hydrocarbon dehydrogenating properties result when zinc oxide replaces a portion of the alumina content of the copper-zinc-alumina composites.

Particles of copper-zinc-alumina catalysts prepared as indicated may be utilized as fillers in suitably heated chambers or tubes through which a gaseous hydrocarbon, as butane, may be passed under substantially atmospheric pressure and at a temperature in the approximate range of 400–750° C. using a vapor space velocity exclusive of hydrogen of the approximate order of 200 to 10,000. Liquid hydrocarbons, such as paraffins, naphthenes, or other hydro-aromatic hydrocarbons, may be dehydrogenated similarly by passage through chambers containing a dehydrogenating catalyst prepared according to the process of this invention. The catalyst temperature and space velocity employed should be chosen to give the optimum degree of dehydrogenation with a relatively low order of accompanying decompositions. Also dehydrogenation of hydrocarbons may be effected in the presence of powdered catalyst mixed therewith and passed through a suitable chamber operated under substantially the conditions indicated.

Dehydrogenation catalysts prepared from metal powders and a refractory support, such as alumina, according to the process of this invention do not undergo excessive carbonization during use in dehydrogenation reactions. When carbonization occurs, as after a long period of service, it is usually advisable to burn the carbonaceous deposits from the catalysts by treatment with a gas of controlled oxygen concentration, followed by heating in hydrogen.

The particles formed from the mixture indicated are relatively hard and resistant to breakage during use, even at high temperatures. For example, the breaking strength of catalyst pellets formed according to the process of this invention was found to be 10 pounds in contrast with a breaking strength of 3 pounds observed on similar pellets produced from a mixture of 10% chromium trioxide and 90% alumina.

While the catalysts comprising essentially alumina, copper, and zinc are preferred for use in the present process, it is still within the scope of the invention to substitute for the copper either in whole or in part metals of the iron group, including iron, nickel, and cobalt although obviously the results obtained will vary with the particular metal substituted and the extent of the substitution.

The following illustrative data are given to indicate typical results obtainable in the operation of the process, although not with the intention of limiting the generally broad scope of the invention:

Example

The following data were obtained using a catalyst prepared by mixing 45 parts of zinc dust, 15 parts of copper powder and 50 parts of alumina powder by weight and pilling the mixture into ⅛" pills. The pills were treated in a stream of nitrogen to remove the lubricant at 575° C. Following this propane gas was passed over the catalyst at the same temperature resulting in the following data:

| Time, min. on stream | Temp. °C. | Space vel. | Moles exit gas /100 mols. $C_3H_8$ | Mol. comp./100— | | Moles $C_3H_8$ charg. total olefins |
|---|---|---|---|---|---|---|
| | | | | $C_3H_6$ | $C_2H_4$ | |
| 19 | 578 | 1,200 | 123 | 12.1 | 1.4 | 13.5 |
| 54 | 580 | 1,180 | 110 | 4.4 | 0.0 | 4.4 |

To show the effect of added hydrogen, a fresh batch of catalyst was treated with hydrogen and following this, propane gas was passed over the catalyst together with hydrogen at 550° C. The concentration of hydrogen was approximate 38-40%, the total space velocity exclusive of hydrogen being 1200-1250. The following data was obtained.

| Time on stream, mins. | Temp., °C. | Space vel. $C_3H_8$ | Space vel. total | Conc. $H_2$, per cent | Moles exit gas/ 100 moles total chg. | Mol. composition/100 moles of $C_3H_8$ charged | | |
|---|---|---|---|---|---|---|---|---|
| | | | | | | $C_3H_6$ | $C_2H_4$ | Total olefins. |
| 13 | 550 | 741 | 1,215 | 39 | 113 | 13.0 | 0.0 | 13.0 |
| 34 | 547 | 731 | 1,205 | 39.3 | 114 | 14.8 | 0.0 | 14.8 |
| 60 | 548 | 736 | 1,210 | 39.2 | 113.5 | 14.2 | 0.0 | 14.2 |
| 107 | 550 | 755 | 1,230 | 38.6 | 113.5 | 12.8 | 0.0 | 12.8 |
| 183 | 548 | 775 | 1,250 | 38 | 112.0 | 10.0 | 0.0 | 10.0 |

It should be noted that the operating temperature is approximately 30 degrees lower using the hydrogen-propane mixture than when propane alone is processed. The olefin formation at the end of three hours is still more than twice the amount produced in the absence of hydrogen. It is obvious that in the above example the total space velocity had to be kept the same.

We claim as our invention:

A process for dehydrogenating normally gaseous paraffins which comprises commingling the same with an amount of hydrogen such as to form a mixture containing about 20-60% of hydrogen, and contacting said mixture at a temperature in the approximate range of 450-700° C. with a catalyst formed by treating with air at a temperature of about 500-600° C. a mixture of approximately equal amounts of copper, zinc and alumina.

VLADIMIR N. IPATIEFF.
VLADIMIR HAENSEL.